United States Patent
Sun et al.

(10) Patent No.: US 11,879,039 B1
(45) Date of Patent: Jan. 23, 2024

(54) PREPARATION METHOD FOR THERMOPLASTIC MULTI-HYBRID POLYIMIDE FILMS

(71) Applicant: Harbin Engineering University, Harbin (CN)

(72) Inventors: Gaohui Sun, Harbin (CN); Kangkang Tao, Harbin (CN); Shihui Han, Harbin (CN); Rongrong Chen, Harbin (CN); Jun Wang, Harbin (CN)

(73) Assignee: HARBIN ENGINEERING UNIVERSITY, Harbin (CN)

( * ) Notice: Subject to any disclaimer, the term of this patent is extended or adjusted under 35 U.S.C. 154(b) by 0 days.

(21) Appl. No.: 18/233,907

(22) Filed: Aug. 15, 2023

(30) Foreign Application Priority Data

Aug. 17, 2022 (CN) .......................... 202210988168.2

(51) Int. Cl.
*C08G 73/10* (2006.01)
*C08J 5/18* (2006.01)
*C08J 3/00* (2006.01)
*C08J 3/24* (2006.01)

(52) U.S. Cl.
CPC ............ *C08J 5/18* (2013.01); *C08G 73/1007* (2013.01); *C08G 73/1035* (2013.01); *C08G 73/1067* (2013.01); *C08J 3/005* (2013.01); *C08J 3/247* (2013.01); *C08J 2379/08* (2013.01)

(58) Field of Classification Search
CPC ..... C08J 5/18; C08J 2379/08; C08G 73/1042; C08G 73/1071
See application file for complete search history.

(56) References Cited

FOREIGN PATENT DOCUMENTS

| CN | 105315466 B | | 8/2017 |
| CN | 110358121 A | | 10/2019 |
| CN | 111087812 | * | 5/2020 |
| CN | 111635525 A | | 9/2020 |
| CN | 109762166 B | | 2/2021 |
| CN | 114196049 A | | 3/2022 |
| JP | 2021024930 | * | 2/2021 |

OTHER PUBLICATIONS

GB/T 13022-1991, Plastics-Determination of tensile properties of films, 1991, pp. 100-103, Bureau of Technical Supervision of the People's Republic of China.
GB/T 30693-2014, Measurement of water-contact angle of plastic films, 2014, pp. 1-9, General Administration of Quality Supervision, Inspection and Quarantine of the People's Republic of China and China National Standardization Administration.

* cited by examiner

*Primary Examiner* — Gregory Listvoyb
(74) *Attorney, Agent, or Firm* — Bayramoglu Law Offices LLC

(57) ABSTRACT

A preparation method for thermoplastic multi-hybrid polyimide films is provided. The method includes the following steps: S1, adding an aromatic diisocyanate to an aromatic dianhydride solution system to obtain an anhydride-terminated polyimide precursor solution containing a seven-membered ring structure named a first solution; S2, adding an aromatic dianhydride to an aromatic diamine solution system to obtain an amino-terminated polyamic acid solution named a second solution; S3, mixing the first solution and the second solution to obtain a uniform multi-polymerization solution; S4, after extending the multi-polymerization solution to form a film, carrying out a gradient heating curing in a vacuum oven and an ordinary oven respectively to obtain a thermoplastic multi-hybrid polyimide film after cooling. The invention prepares a thermoplastic multi-hybrid polyimide film with better comprehensive performance rapidly, the preparation process is simple, and the production cost is effectively reduced.

7 Claims, 3 Drawing Sheets

PREPARATION METHOD FOR THERMOPLASTIC MULTI-HYBRID POLYIMIDE FILMS

CROSS REFERENCE TO THE RELATED APPLICATIONS

This application is based upon and claims priority to Chinese Patent Application No. 202210988168.2, filed on Aug. 17, 2022, the entire contents of which are incorporated herein by reference.

TECHNICAL FIELD

The invention relates to high-performance film material, in particular to a preparation method for thermoplastic multi-hybrid polyimide films.

BACKGROUND

It is well known that polyimide mainly includes anhydride-amine system polyimide and isocyanate-based polyimide. The polyimide polymerization process of the anhydride-amine system is simple, polyamic acid solution is synthesized by anhydride and diamine, and then polyimide can be generated by thermal curing or chemical dehydration cyclization. However, the polyamide acid chain is prone to partial cracking during high-temperature curing, so the polyimide chain length is smaller than the precursor polyamide acid chain length, which has a great impact on film performance. The preparation of isocyanate-based polyimide is based on diisocyanate and dianhydride as reaction monomers, the seven-membered ring intermediate is synthesized first, and then the seven-membered ring is converted to an imide ring structure under high-temperature conditions. However, since both isocyanate and anhydride are electrophilic monomers, the degree of polymerization of the chain segment is not high during the polycondensation reaction, the mechanical properties of the isocyanate-based polyimide film are poor (tensile strength is 60-70 MPa), and the hydrophobic properties are not very ideal (static water contact angle is about 66°), which limits its application in the field of microelectronics greatly, resulting in problems such as hygroscopic electrical breakdown and packaging substrate fracture during the use of electronic devices. In addition, polyimide films also have the problem of poor hydrophobicity. This is because the oxygen and nitrogen polarizability in the imide structure is large, and the electronegativity is strong, which can form a stable hydrogen bond between the electron donor and the hydrogen atom in the water molecule.

The patent CN109762166B disclosed a preparation method for a polyimide precursor and a polyimide film, which used diamine as a bridging agent to link the oligomeric anhydride-based terminated seven-membered ring precursor, an isocyanate-based polyimide film with improved mechanical properties was successfully prepared, the tensile strength was up to 114 MPa, but the hydrophobic performance was ordinary. The patent CN110358121A disclosed a method for preparing polyimide films by microwave irradiation at low temperatures, the degradation of polyamic acid was reduced by microwave irradiation at low-temperature imidization so that the tensile strength of the polyimide film of the anhydride-amine system reached 121 MPa. However, limited by the size of the microwave equipment box and the extremely long processing time, this method was not suitable for the industrialization of polyimide film. The patent CN114196049A disclosed a preparation method for a strong hydrophobic polyimide film, a polyimide film with good hydrophobic properties was prepared by using a fluorine-containing hydrophobic modifier and silica. The patent CN11635525A disclosed a low dielectric constant hydrophobic polyimide film and its preparation method, a polyimide film with low dielectric constant and good hydrophobic properties was prepared by using fluorine-containing monomer and modified TS-1 molecular sieve. The patent CN105315466B disclosed a preparation method for polyimide with fluorine-containing silicon structure in the main chain, a polyimide film with good hydrophobic properties was successfully prepared through the copolymerization reaction between monomers such as perfluoroisocyanate. Although the introduction of a fluorine-containing structure could effectively improve the hydrophobicity of polyimide film, its monomer price was significantly higher than that of ordinary dianhydride monomer, which increased the production cost of hydrophobic polyimide film greatly. For example, the price of the commonly used fluorinated anhydride monomer 4,4'-(hexafluoroisopropene) diphthalic anhydride was more than 5 times higher than that of 3,3',4,4'-benzophenone tetracarboxylic dianhydride, and more than 20 times higher than that of pyromellitic dianhydride. At the same time, the existing technical route was not suitable for industrialization due to the complex and high-cost preparation process.

It can be seen that the design of the directional molecular structure and the improvement of the preparation process are the most commonly used means to obtain high-performance intrinsic polyimide films. However, due to the difficulty of designing new structures, the high production cost of special structural monomers, and complex preparation processes, inevitably bring great resistance to the low-cost industrial production of high-performance intrinsic polyimide film products.

SUMMARY

The purpose of the invention is to provide a preparation method for thermoplastic multi-hybrid polyimide films. The invention prepares thermoplastic multi-hybrid polyimide films with better comprehensive performance simply and quickly, this method reduces the production cost effectively.

The technical solution of the invention: a preparation method for thermoplastic multi-hybrid polyimide films, including the following steps:

S1, adding an aromatic diisocyanate to an aromatic dianhydride solution system according to a molar ratio of anhydride to isocyanate of 1.05:1-1.10:1, and stirring in a nitrogen atmosphere for reaction for 8-12 h to obtain an anhydride-terminated polyimide precursor solution containing the seven-membered ring structure named solution I;

S2, adding an aromatic dianhydride to an aromatic diamine solution system according to a molar ratio of diamine to anhydride of 1.04:1-1.08:1, stirring for reaction for 4-8 h to obtain an amino-terminated polyamic acid solution named solution II;

S3, mixing solution I and solution II for reaction for 10-20 min according to a weight ratio of 1:1.6-1:3.2 to obtain a uniform multi-polymerization solution;

S4, after extending the multi-polymerization solution to form a film, carrying out a gradient heating curing in a vacuum oven and an ordinary oven respectively, and cooling to obtain a thermoplastic multi-hybrid polyimide film.

In the above-mentioned preparation method for thermoplastic multi-hybrid polyimide films, a weight percentage of the anhydride-terminated polyimide precursor containing a seven-membered ring structure of solution I is 15%-25%; a weight percentage of the amino-terminated polyamic acid in solution II is 15%-25%.

In the above-mentioned preparation method for thermoplastic multi-hybrid polyimide films, a reaction temperature of solution I is 90-100° C.; a reaction temperature of solution II is −5-25° C.; a mixing temperature of step S3 is −15-25° C.

In the above-mentioned preparation method for thermoplastic multi-hybrid polyimide films, the mixing method for the aromatic dianhydride and the aromatic diamine solution in step S2 is as follows: evenly dividing the aromatic dianhydride into 4-6 portions and adding the aromatic dianhydride to a polar solvent solution containing aromatic diamine in 2-4 batches, adding the next batch immediately after the previous batch is completely dissolved and an amount of each batch is 1-3 portions.

In the above-mentioned preparation method for thermoplastic multi-hybrid polyimide films, the aromatic diisocyanate in step S1 includes one or a mixture of 2,4'-diphenylmethane diisocyanate, 4,4'-diphenylmethane diisocyanate, 2,2'-methylene diphenyl diisocyanate, toluene-2,4-diisocyanate, toluene-2,5-diisocyanate, toluene-2,6-diisocyanate, toluene-3,4-diisocyanate, toluene-3,5-diisocyanate, 3,3'-dimethylbiphenyl-4,4'-diisocyanate, m-phenylene diisocyanate, p-phenylene diisocyanate, o-phenylene dimethyl diisocyanate, naphthalene diisocyanate, benzenedimethylene diisocyanate and tetramethylbenzenedimethylene diisocyanate.

In the above-mentioned preparation method for thermoplastic multi-hybrid polyimide films, the aromatic dianhydride in step S1 and step S2 includes one or a mixture of pyromellitic dianhydride, dibromo pyromellitic dianhydride, 4,4'-diphenyl ether dianhydride, 3,3',4,4'-diphenyl ether tetracarboxylic dianhydride, 3,3',4,4'-diphenyl sulfone tetracarboxylic dianhydride, 3,3',4,4'-diphenyl tetracarboxylic dianhydride, 3,3',4,4'-diphenyl ketone tetracarboxylic dianhydride, 2,3,3',4'-diphenyl ether tetracarboxylic dianhydride, 3,3',4,4'-triphenyl ether tetracarboxylic dianhydride, 4,4'-(4,4'-isopropyldiphenoxy) tetracarboxylic anhydride, 2,2'-dimethyl-3,3',4,4'-biphenyltetracarboxylic dianhydride, 2,2'-diphenyl-3,3',4,4'-biphenyltetracarboxylic dianhydride and 5,5'-methylenebis (isobenzofuran-1,3-dione).

In the above mentioned preparation method for thermoplastic multi-hybrid polyimide films, the aromatic diamine in step S2 includes one or a mixture of 3,4'-diaminodiphenyl ether, 4,4'-diaminodiphenyl ether, 4,4'-diaminobenzophenone, 1,3-bis (3-aminophenoxy) benzene, 1,3-bis (4-aminophenoxy) benzene, m-phenylenediamine, p-phenylenediamine, 3,3'-diaminodiphenyl sulfone, 4,4'-diaminodiphenyl sulfone, 4-bis (4-diaminophenoxy) diphenyl sulfone, 4-bis (3-diaminophenoxy) phenyl sulfone, 4,4'-bis (3-aminophenoxy) biphenyl, 4,4'-bis (4-aminophenoxy) biphenyl, 4,4'-diaminodiphenylmethane and diethyltoluenediamine.

In the above-mentioned preparation method for thermoplastic multi-hybrid polyimide films, the gradient heating curing in step S4 includes the first gradient heating stage and the second gradient heating stage, the first gradient heating stage: raising the temperature to 80-90° C., 100-110° C., 130-140° C. in turn in the vacuum oven, and curing in each temperature section for 2-3 h at a vacuum degree being maintained at 75-85 kPa; the second gradient heating stage: raising a temperature to 160-180° C., 190-210° C., 240-260° C., 290-310° C. and 320-340° C. in turn in the ordinary oven, and curing each temperature section for 1-2 h.

Compared with the prior arts, the beneficial effects of the invention are as follows:

The invention provides a thermoplastic polyimide film and its preparation method for enhancing intrinsic mechanics and hydrophobic properties through a multi-hybrid composite. In this invention, the anhydride-terminated polyimide precursor solution containing a seven-membered ring structure synthesized by a cheap monomer and the amino-terminated polyamic acid solution are mixed again, and the terminal group reaction between the two types of short straight-chain terminated polyimide precursors, the stage control of the solution ratio and the curing temperature are used to realize the hybrid composite and chemical bonding of the two types of polyimide structures in one step without changing the original structure of the short straight chain, the thermoplastic multi-hybrid polyimide film with good thermal properties, intrinsic mechanical properties, and hydrophobic properties is rapidly prepared. This invention solves the problems that exist in heat resistance and mechanics of pure isocyanate-based polyimide film (50-70 MPa, hydrophilic) and the problems that the structure of the polyimide film precursor of the anhydride-amine system is easy to crack during high-temperature curing.

At the same time, the short linear chain grows and molecular weight increases, on the one hand, it can make up for the problem of the decrease of molecular weight and mechanical properties caused by the high-temperature chain scission of polyimide, and improve the mechanical properties of the film; on the other hand, it can improve the local crystallinity and the degree of linear orientation, reduce the transmittance of water molecules effectively, improve the hydrophobicity of the film greatly, and solve the common problem of poor hydrophobicity of the polyimide films without any fluorine-containing chain in two systems.

The tensile strength of the prepared thermoplastic multi-hybrid polyimide film is 101.40-126.04 MPa. Compared with the isocyanate-based film prepared by the anhydride-terminated polyimide precursor solution containing a seven-membered ring structure and the anhydride-amine system polyimide film prepared by the amino-terminated polyamic acid solution, the tensile strength is increased by 53%-91% and 3%-28%, respectively. At the same time, the thermoplastic multi-hybrid polyimide film also has good intrinsic hydrophobic properties, and the static water contact angle is 98-100° without any fluorine-containing functional group.

Under the premise of not introducing special monomers, other polymer segments, and high-performance hydrophobic fillers, the invention successfully prepares a thermoplastic polyimide film with better comprehensive performance, especially the better hydrophobic performance, through the innovation and optimization of the synthesis and curing process. The preparation process is simple, the modification strategy is ingenious, and it has the potential to realize industrialization. At the same time, it can effectively reduce the raw material cost of high-performance polyimide film production and improve the profit rate of production enterprises.

DETAILED DESCRIPTION OF THE EMBODIMENTS

Figure 1A:
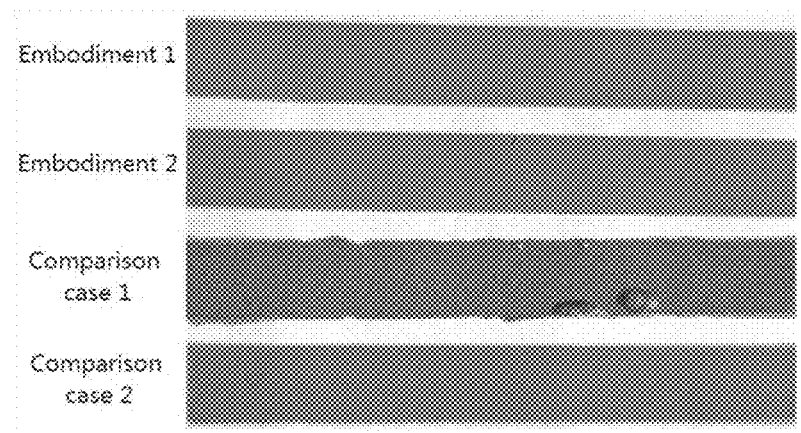
FIGS. 1A-1C are a series of polyimide film digital photos prepared by the embodiments and comparison cases of the invention.
Figure 1B:
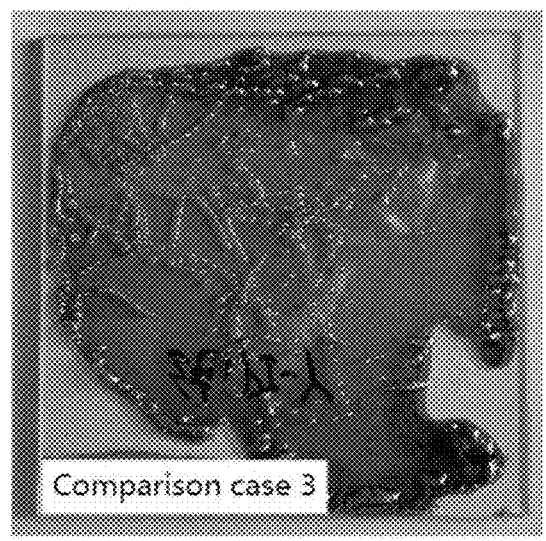
Figure 1C:
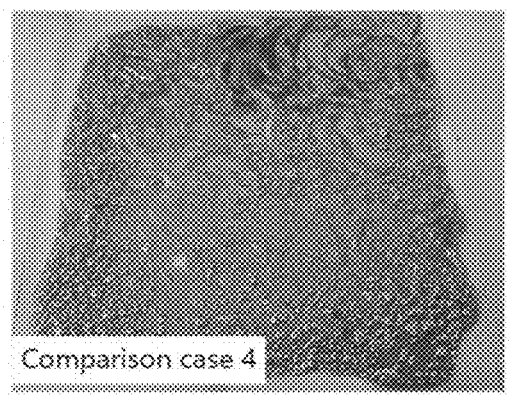

A preparation method for thermoplastic multi-hybrid polyimide films, including the following steps:

S1, an aromatic diisocyanate is added to an aromatic dianhydride solution system slowly by drops according to the molar ratio of anhydride to isocyanate of 1.05:1-1.10:1, and the mixture is stirred in a nitrogen atmosphere for reaction for 8-12 h at a reaction temperature of 90-100° C. to obtain an anhydride-terminated polyimide precursor solution containing a seven-membered ring structure named solution I; the weight percentage of the anhydride-terminated polyimide precursor containing a seven-membered ring structure of solution I is 15%-25%.

S2, an aromatic dianhydride is added to an aromatic diamine solution system according to the molar ratio of diamine to anhydride of 1.04:1-1.08:1, the aromatic dianhydride is evenly divided into 4-6 portions and is added to the polar solvent solution containing aromatic diamine in 2-4 batches, the next batch is added immediately after the previous batch is completely dissolved and the amount of each batch is 1-3 portions, the mixture is stirred for reaction for 4-8 h at a reaction temperature of −5-25° C. to obtain an amino-terminated polyamic acid solution named solution 11; the weight percentage of amino-terminated polyamic acid in solution II is 15%-25%.

S3, solution I and solution II are mixed for reaction for 10-20 min according to the weight ratio of 1:1.6-1:3.2 at a temperature of −15-25° C. to obtain a uniform multi-polymerization solution.

S4, after the multi-polymerization solution is extended to form a film, a gradient heating curing is carried out in a vacuum oven and an ordinary oven respectively, including the first gradient heating stage and the second gradient heating stage, the first gradient heating stage: the temperature is raised to 80-90° C., 100-110° C., 130-140° C. in turn in the vacuum oven, and each temperature section is cured for 2-3 h, during which the vacuum degree is maintained at 75-85 kPa; this stage controls the volatilization rate of solvent and carbon dioxide, reduces the generation of bubbles on the surface of the film, and ensures the apparent quality.

The second gradient heating stage: the temperature is raised to 160-180° C., 190-210° C., 240-260° C., 290-310° C. and 320-340° C. in turn in the ordinary oven, and each temperature section is cured for 1-2 h, the solvent is completely removed and the imide structure is completely transformed in this stage.

the aromatic diisocyanate includes one or a mixture of 2,4'-diphenylmethane diisocyanate, 4,4'-diphenylmethane diisocyanate, 2,2'-methylene diphenyl diisocyanate, toluene-2,4-diisocyanate, toluene-2,5-diisocyanate, toluene-2,6-diisocyanate, toluene-3,4-diisocyanate, toluene-3,5-diisocyanate, 3,3'-dimethylbiphenyl-4,4'-diisocyanate, m-phenylene diisocyanate, p-phenylene diisocyanate, o-phenylene dimethyl diisocyanate, naphthalene diisocyanate, benzenedimethylene diisocyanate, and tetramethylbenzenedimethylene diisocyanate.

the aromatic dianhydride includes one or a mixture of pyromellitic dianhydride, dibromo pyromellitic dianhydride, 4,4'-diphenyl ether dianhydride, 3,3',4,4'-diphenyl ether tetracarboxylic dianhydride, 3,3',4,4'-diphenyl sulfone tetracarboxylic dianhydride, 3,3',4,4'-diphenyl tetracarboxylic dianhydride, 3,3',4,4'-diphenyl ketone tetracarboxylic dianhydride, 2,3,3',4'-diphenyl ether tetracarboxylic dianhydride, 3,3',4,4'-triphenyl ether tetracarboxylic dianhydride, 4,4'-(4,4'-isopropyldiphenoxy) tetracarboxylic anhydride, 2,2'-dimethyl-3,3',4,4'-biphenyltetracarboxylic dianhydride, 2,2'-diphenyl-3,3',4,4'-biphenyltetracarboxylic dianhydride and 5,5'-methylenebis (isobenzofuran-1,3-dione).

the aromatic diamine includes one or a mixture of 3,4'-diaminodiphenyl ether, 4,4'-diaminodiphenyl ether, 4,4'-diaminobenzophenone, 1,3-bis (3-aminophenoxy) benzene, 1,3-bis (4-aminophenoxy) benzene, m-phenylenediamine, p-phenylenediamine, 3,3'-diaminodiphenyl sulfone, 4,4'-diaminodiphenyl sulfone, 4-bis (4-diaminophenoxy) diphenyl sulfone, 4-bis (3-diaminophenoxy) phenyl sulfone, 4,4'-bis (3-aminophenoxy) biphenyl, 4,4'-bis (4-aminophenoxy) biphenyl, 4,4'-diaminodiphenylmethane and diethyltoluenediamine.

The following is a further explanation of the invention in combination with the embodiment, but it is not the basis for the limitation of the invention.

Embodiment 1

S1, the oil bath was preheated to 95° C., and 8.4 g 3,3',4,4',-benzophenonetetracarboxylic dianhydride (0.026 mol) was added to a three-necked flask containing 57.6 g N-methylpyrrolidone. After the solution was completely dissolved by stirring, 6.0 g diphenylmethane diisocyanate (0.024 mol) was slowly added dropwise into the three-necked flask, it was protected by nitrogen and refluxed by condensation, stirring reaction for 10 h to obtain a solution with a weight percentage of 20% of the anhydride-terminated polyimide precursor containing a seven-membered ring structure, which was named solution I.

S2, 5.21 g 4,4'-diaminodiphenyl ether (0.026 mol) was added to a three-necked flask containing 73.33 g N-methylpyrrolidone at 25° C. 7.73 g 3,3',4,4',-benzophenonetetracarboxylic dianhydride (0.024 mol) was evenly divided into 4 portions after stirring and dissolving completely and added to a three-necked flask in 4 batches. After the first batch was dissolved completely, the next batch was added immediately, 1 portion for each batch, and stirring reaction for 6 h to obtain a solution with a weight percentage of 15% of amino-terminated polyamic acid, which was named solution II.

S3, 10 g solution II and 5 g solution I were added to a beaker in turn, and the uniform binary polymerization solution was obtained after stirring at 25° C. for 12 min.

S4, the binary polymerization solution was poured on a clean glass plate to form a film, and the wet film was placed in a vacuum oven for a heating curing in the first gradient heating stage. Specifically, it was heated to 80° C., 110° C. and 140° C. in turn, and each curing time was 3 h, and the vacuum degree was 80 kPa; then the film was transferred to an ordinary oven for heating curing in the second gradient heating stage. Specifically, it was heated to 170° C., 200° C., 250° C., 300° C. and 330° C. in turn, and the curing time was 2 h, 2 h, 1 h, 1 h, and 1 h, respectively. After cooling, a thermoplastic multi-hybrid polyimide film was obtained.

Embodiment 2

S1, the oil bath was preheated to 95° C., and 8 g 4,4'-diphenyl ether dianhydride (0.026 mol) was added to a three-necked flask containing 56 g N-methylpyrrolidone. After the solution was completely dissolved by stirring, 6 g diphenylmethane diisocyanate (0.024 mol) was slowly added dropwise into the three-necked flask, it was protected by nitrogen and refluxed by condensation, stirring reaction for 10 h to obtain a solution with a weight percentage of 20% of the anhydride-terminated polyimide precursor containing a seven-membered ring structure, which was named solution I.

S2, 5.21 g 4,4'-diaminodiphenyl ether (0.026 mol) was added to a three-necked flask containing 71.68 g N-methylpyrrolidone at 25° C. 7.44 g 4,4'-diphenyl ether dianhydride (0.024 mol) was evenly divided into 4 portions after stirring and dissolving completely and added to a three-necked flask in 4 batches. After the first batch was dissolved completely, the next batch was added immediately, 1 portion for each batch, and stirring reaction for 6 h to obtain a solution with a weight percentage of 15% of amino-terminated polyamic acid, which was named solution II.

S3, 10.38 g solution II and 4.38 g solution I were added to a beaker in turn, and the uniform binary polymerization solution was obtained after stirring at 25° C. for 12 min.

S4, the binary polymerization solution was poured on a clean glass plate to form a film, and the wet film was placed in a vacuum oven for a heating curing in the first gradient heating stage. Specifically, it was heated to 80° C., 110° C. and 140° C. in turn, and each curing time was 3 h, and the vacuum degree was 80 kPa; then the film was transferred to an ordinary oven for heating curing in the second gradient heating stage. Specifically, it was heated to 170° C., 200° C., 250° C., 300° C. and 330° C. in turn, and the curing time was 2 h, 2 h, 1 h, 1 h, and 1 h, respectively. After cooling, a thermoplastic multi-hybrid polyimide film was obtained.

Comparison Case 1:

The oil bath was preheated to 95° C., and then 5 g 4,4'-diphenyl ether dianhydride (0.016 mol) was added to a three-necked flask containing 27 g N-methylpyrrolidone. After stirring and dissolving completely, 4.0 g diphenylmethane diisocyanate (0.016 mol) was slowly added dropwise to a three-necked flask, it was protected by nitrogen and refluxed by condensation. Stirring reaction for 10 h to obtain a solution with a weight percentage of 25% of the polyimide precursor containing a seven-membered ring structure. 10 g polyimide precursor solution was taken and poured on a clean glass plate, the wet film was placed in a vacuum oven and heated to 80° C., 110° C. and 140° C. for curing, the each curing time was 3 h and the vacuum degree was 80 kPa. Then the film was transferred to an ordinary oven and heated to 170° C., 200° C., and 220° C. for curing, and the curing time was 2 h, 2 h, and 1 h, respectively. After cooling, an isocyanate-based polyimide film was obtained.

Comparison Case 2:

5 g 4,4'-diaminodiphenyl ether (0.025 mol) was added to a three-necked flask containing 38.28 g N-methylpyrrolidone at 25° C. After stirring and dissolving completely, 7.76 g 4,4'-diphenyl ether dianhydride (0.025 mol) was evenly divided into 4 portions and added to a three-necked flask in 4 batches. After the previous batch was dissolved completely, the next batch was added immediately, 1 portion for each batch, and stirring reaction for 6 h to obtain a solution with a weight percentage of polyamic acid of 25%. 10 g polyamic acid solution was taken and poured on a clean glass plate. The wet film was placed in a vacuum oven and heated to 80° C., 110° C., and 140° C. for curing, the curing time was 3 h each time, and the vacuum degree was 80 kPa. Then the film was transferred to the ordinary oven and then heated to 170° C., 200° C., 250° C., 300° C., and 330° C. for curing, and the curing time was 2 h, 2 h, 1 h, 1 h, 1 h, respectively. After cooling, an anhydride-amine system polyimide film was obtained.

Comparison Case 3:

The oil bath was preheated to 95° C., and then 5 g 4,4'-diphenyl ether dianhydride (0.016 mol) was added to a three-necked flask containing 27 g N-methylpyrrolidone. After stirring and dissolving completely, 4.0 g diphenylmethane diisocyanate (0.016 mol) was slowly added dropwise to a three-necked flask, it was protected by nitrogen and refluxed by condensation. Stirring reaction for 10 h to obtain a solution with a weight percentage of 25% of the polyimide precursor containing a seven-membered ring structure. 10 g polyimide precursor solution was taken and poured on a clean glass plate, the wet film was placed in a vacuum oven and heated to 80° C., 120° C. and 160° C. for curing, the curing time was 2 h and the vacuum degree was 80 kPa. Then the film was transferred to an ordinary oven and heated to 200° C., 250° C., and 300° C. for curing, and the curing time was 1 h each time, respectively. After cooling, an isocyanate-based polyimide film was obtained.

Comparison Case 4.

The oil bath was preheated to 95° C., and then 5 g 4,4'-diphenyl ether dianhydride (0.016 mol) was added to a three-necked flask containing 27 g N-methylpyrrolidone. After stirring and dissolving completely, 4.0 g diphenylmethane diisocyanate (0.016 mol) was slowly added dropwise to a three-necked flask, it was protected by nitrogen and refluxed by condensation. Stirring reaction for 10 h to obtain a solution with a weight percentage of 25% of the polyimide precursor containing a seven-membered ring structure. 10 g polyimide precursor solution was taken and poured on a clean glass plate, the wet film was placed in a vacuum oven and heated to 80° C., 110° C. and 140° C. for curing, the curing time was 2 h each time and the vacuum degree was 80 kPa. Then the film was transferred to an ordinary oven and heated to 170° C., 200° C., 250° C., 300° C. and 330° C. for curing, and the curing time was 2 h, 2 h, 1 h, 1 h, and 1 h, respectively. After cooling, an isocyanate-based polyimide film was obtained.

The Performance Test of the Films:

Test samples: films prepared by Embodiment 1, Embodiment 2, Comparison case 1, Comparison case 2, Comparison case 3, and Comparison case 4.

The test methods and standards are as follows:

The tensile test of mechanical properties adopts the GB/T 13022-1991 test standard, the sample is a long strip sample of 10*150 mm, and the tensile rate is 2 mm/min.

The heating rate of the thermogravimetric test is 20° C./min, and the heating rate of the DSC test is 10° C./min.

The magnification of digital photos is 1.5 times.

The water contact angle test adopts the GB/T 30693-2014 test standard. The water droplet volume is 1 μL, the test temperature is 23° C., and the relative humidity is 52%.

Figures 2A, 2B:
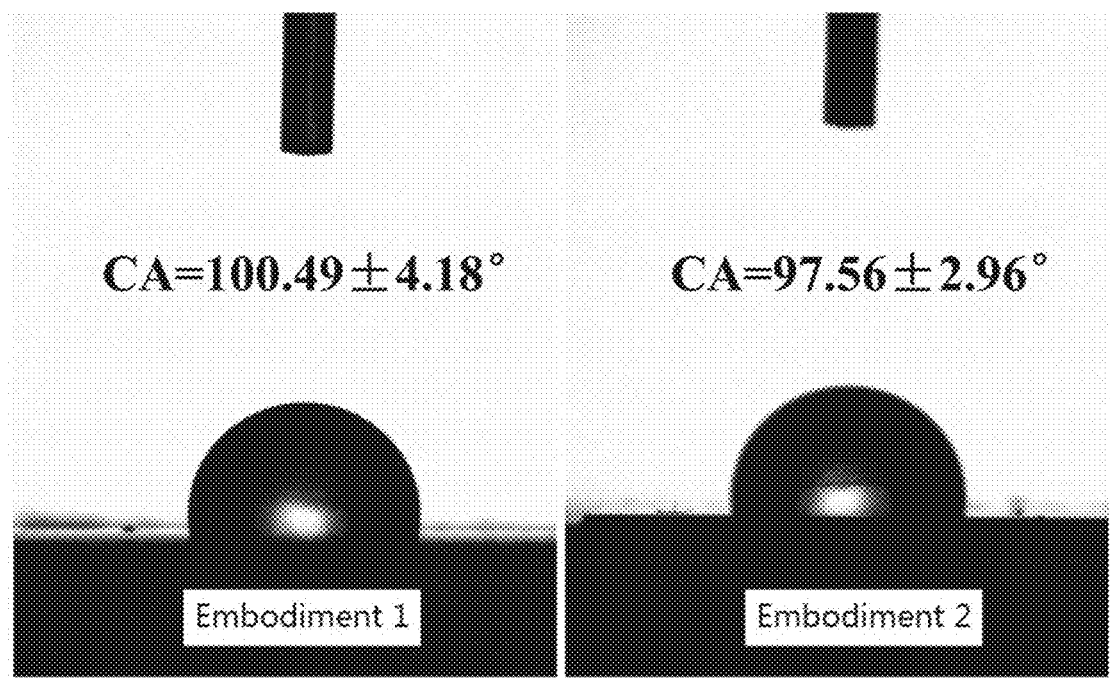
FIGS. 2A-2B are a static water contact angle of the film prepared by the embodiment of the invention.
Figure 3:
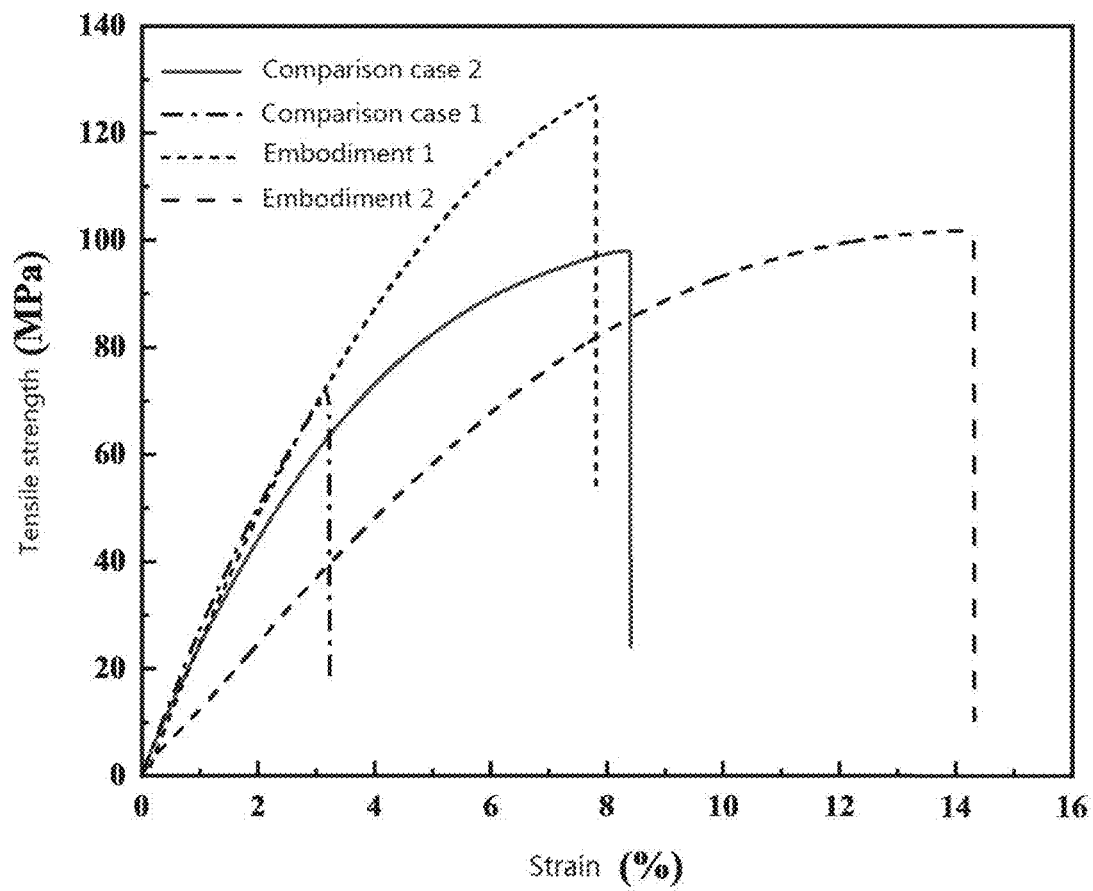
FIG. 3 is a stress-strain curve of a series of polyimide films prepared by the embodiments and comparison cases of the invention.

The tensile test results of the film are shown in Table 1, and the thermal performance test results of the film are shown in Table 2. In Table 2, $T_{5\%}$ and $T_{10\%}$ refer to the temperature corresponding to the mass loss of 5% and 10% during the thermal analysis test of the sample, which are used to characterize the thermal stability of the multi-hybrid polyimide film. The digital photos of the film are shown in FIGS. 1A-IC, the static water contact angle test results of the film are shown in FIGS. 2A-2B, and the stress-strain properties of the film are shown in FIG. 3.

TABLE 1

Mechanical property data of polyimide film in the embodiments and comparison cases of the invention

| Samples | Tensile strength/ MPa | Elastic modulus/ GPa | Breaking elongation/ % | Amplification 1 | Amplification 2 |
|---|---|---|---|---|---|
| Embodiment 1 | 126.04 | 2.61 | 7.60 | 91% | 28% |
| Embodiment 2 | 101.40 | 1.20 | 16.00 | 53% | 3% |
| Comparison case 1 | 66.16 | 2.71 | 3.30 | — | |
| Comparison case 2 | 98.42 | 2.27 | 8.20 | — | |

In Table 1, Amplification 1 and Amplification 2 refer to the increased ratio of tensile strength of Embodiment 1 and Embodiment 2 compared with Comparison case 1 and Comparison case 2, respectively.

TABLE 2

Thermal performance data of a series of polyimide films in the embodiments of the invention

| Samples | $T_{5\%}$/° C. | $T_{10\%}$/° C. | $T_g$/° C. |
|---|---|---|---|
| Embodiment 1 | 541 | 564 | 262 |
| Embodiment 2 | 549 | 568 | 265 |

Experimental conclusion: It could be seen from the digital photos of FIGS. 1A-IC that the surface of the multi-hybrid polyimide films in Embodiment 1 and Embodiment 2 were smooth with a good film-forming effect. The films of Comparison case 1, Comparison case 3 and Comparison case 4 were equivalent to the isocyanate-based polyimide film prepared by solution I alone, and the film of Comparison case 2 was equivalent to the anhydride-amine system polyimide film prepared by solution II alone. By comparing Comparison case 1, Comparison case 3, and Comparison case 4, it could be found that under the ordinary gradient heating curing process and the gradient heating curing process of the invention, the isocyanate-based polyimide film prepared by solution I alone could not form a film at high temperature, and there were a large number of bubbles and fragmentation, a firm could be formed only at the highest curing temperature of 220° C.

It can be seen from the data in FIG. 3 and Table 1 that the multi-hybrid polyimide films in Embodiment 1 and Embodiment 2 have significantly enhanced mechanical properties. Among them, the tensile strength is 126.04 MPa and 101.40 MPa respectively, which is 91%, 28%, and 53%, 3% higher than that of Comparison case 1 and Comparison case 2, respectively.

It can be seen from the thermal performance data in Table 2 that the multi-hybrid polyimide film in Embodiment 1 and Embodiment 2 has good thermal stability. At the same time, it can be seen from FIGS. 2A-2B that the multi-hybrid polyimide film in Embodiment 1 and Embodiment 2 also has good intrinsic hydrophobic properties, and the static water contact angles without any fluorine-containing functional groups reach 100.49° and 97.56°, respectively.

What is claimed is:

1. A preparation method for a thermoplastic multi-hybrid polyimide film, comprising the following steps:
   S1, adding an aromatic diisocyanate to an aromatic dianhydride solution system according to a molar ratio of anhydride to isocyanate of 1.05:1-1.10:1, and stirring in a nitrogen atmosphere for a first reaction for 8-12 h to obtain an anhydride-terminated polyimide precursor solution containing a seven-membered ring structure named a first solution, where in a weight percentage of an anhydride-terminated polyimide precursor containing the seven-membered ring structure of the first solution is 15%-25%;
   S2, adding an aromatic dianhydride to an aromatic diamine solution system according to a molar ratio of diamine to anhydride of 1.04:1-1.08:1, stirring for a second reaction for 4-8 h to obtain an amino-terminated polyamic acid solution named a second solution; wherein a weight percentage of an amino-terminated polyamic acid in the second solution is 15%-25%,
   S3, mixing the first solution and the second solution according to a weight ratio of 1:1.6-1:3.2 for a third reaction for 10-20 min to obtain a multi-polymerization solution;
   S4, after extending the multi-polymerization solution to form a film, carrying out a gradient heating curing in a vacuum oven and an ordinary oven respectively, and cooling to obtain the thermoplastic multi-hybrid polyimide film.

2. The preparation method for the thermoplastic multi-hybrid polyimide films according to claim 1, wherein a reaction temperature of the first solution is 90-100° C.; a reaction temperature of the second solution is −5-25° C.; a mixing temperature of step S3 is −15-25° C.

3. The preparation method for the thermoplastic multi-hybrid polyimide films according to claim 1, wherein a mixing method for the aromatic dianhydride and the aromatic diamine solution system in step S2 is as follows: evenly dividing the aromatic dianhydride into 4-6 portions and adding the aromatic dianhydride to a polar solvent solution containing aromatic diamine in 2-4 batches, and an amount of each batch is 1-3 portions.

4. The preparation method for the thermoplastic multi-hybrid polyimide films according to claim 1, wherein the aromatic diisocyanate in step S1 comprises one or a mixture of 2,4'-diphenylmethane diisocyanate, 4,4'-diphenylmethane diisocyanate, 2,2'-methylene diphenyl diisocyanate, toluene-2,4-diisocyanate, toluene-2,5-diisocyanate, toluene-2,6-diisocyanate, toluene-3,4-diisocyanate, toluene-3,5-diisocyanate, 3,3'-dimethylbiphenyl-4,4'-diisocyanate, m-phenylene diisocyanate, p-phenylene diisocyanate, o-phenylene dimethyl diisocyanate, naphthalene diisocyanate, benzenedimethylene diisocyanate, and tetramethylbenzenedimethylene diisocyanate.

5. The preparation method for the thermoplastic multi-hybrid polyimide films according to claim 1, wherein the aromatic dianhydride in step S1 and step S2 comprises one or a mixture of pyromellitic dianhydride, dibromo pyromellitic dianhydride, 4,4'-diphenyl ether dianhydride, 3,3',4,4'-diphenyl ether tetracarboxylic dianhydride, 3,3',4,4'-diphenyl sulfone tetracarboxylic dianhydride, 3,3',4,4'-diphenyl tetracarboxylic dianhydride, 3,3',4,4'-diphenyl ketone tetracarboxylic dianhydride, 2,3,3',4'-diphenyl ether tetracarboxylic dianhydride, 3,3',4,4'-triphenyl ether tetracarboxylic dianhydride, 4,4'-(4,4'-isopropyldiphenoxy) tetracarboxylic anhydride, 2,2'-dimethyl-3,3',4,4'-biphenyltetracarboxylic dianhydride, 2,2'-diphenyl-3,3',4,4'-biphenyltetracarboxylic dianhydride, and 5,5'-methylenebis (isobenzofuran-1,3-dione).

6. The preparation method for the thermoplastic multi-hybrid polyimide films according to claim 1, wherein aromatic diamine in step S2 comprises one or a mixture of 3,4'-diaminodiphenyl ether, 4,4'-diaminodiphenyl ether, 4,4'-diaminobenzophenone, 1,3-bis (3-aminophenoxy) benzene, 1,3-bis (4-aminophenoxy) benzene, m-phenylenediamine, p-phenylenediamine, 3,3'-diaminodiphenyl sulfone, 4,4'-diaminodiphenyl sulfone, 4-bis (4-diaminophenoxy) diphenyl sulfone, 4-bis (3-diaminophenoxy) phenyl sulfone, 4,4'-bis (3-aminophenoxy) biphenyl, 4,4'-bis (4-aminophenoxy) biphenyl, 4,4'-diaminodiphenylmethane, and diethyltoluenediamine.

7. The preparation method for the thermoplastic multi-hybrid polyimide films according to claim 1, wherein the gradient heating curing in step S4 comprises a first gradient heating stage and a second gradient heating stage, the first gradient heating stage comprises: raising a temperature to 80-90° C., 100-110° C., and 130-140° C. in turn in the vacuum oven, and curing in each temperature section for 2-3 h at a vacuum degree being maintained at 75-85 kPa; the second gradient heating stage comprises: raising the temperature to 160-180° C., 190-210° C., 240-260° C., 290-310° C. and 320-340° C. in turn in the ordinary oven, and curing in each temperature section for 1-2 h.

* * * * *